United States Patent
Shen et al.

(10) Patent No.: US 11,960,720 B2
(45) Date of Patent: Apr. 16, 2024

(54) DATA PROCESSING METHOD AND DEVICE

(71) Applicant: Huawei Technologies Co., Ltd., Shenzhen (CN)

(72) Inventors: Yong Shen, Shenzhen (CN); Yi He, Chengdu (CN); Tao Cheng, Shenzhen (CN); Li Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 17/903,233

(22) Filed: Sep. 6, 2022

(65) Prior Publication Data

US 2023/0004298 A1   Jan. 5, 2023

Related U.S. Application Data

(63) Continuation of application No. PCT/CN2021/078734, filed on Mar. 2, 2021.

(30) Foreign Application Priority Data

Mar. 6, 2020   (CN) .......................... 202010153571.4

(51) Int. Cl.
*G06F 3/06*   (2006.01)

(52) U.S. Cl.
CPC .......... *G06F 3/0605* (2013.01); *G06F 3/0634* (2013.01); *G06F 3/0659* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 4,821,264 A * | 4/1989 | Kim | .................... H04Q 11/0428 370/465 |
| 6,735,217 B1 | 5/2004 | Webber, Jr. et al. | |
| 2005/0144223 A1 | 6/2005 | Yang et al. | |
| 2008/0089340 A1 | 4/2008 | Tong | |
| 2012/0240125 A1 * | 9/2012 | Danko | ....................... G06F 9/50 718/104 |
| 2013/0205284 A1 * | 8/2013 | Chakrabarti | ............ G06F 9/467 717/151 |
| 2016/0124880 A1 | 5/2016 | Goren et al. | |
| 2017/0262227 A1 * | 9/2017 | Bradbury | ................ G06F 3/061 |
| 2018/0210891 A1 * | 7/2018 | Oliver | ..................... G06F 16/22 |
| 2018/0335962 A1 * | 11/2018 | Rostagni | .................. G06F 3/067 |
| 2019/0188138 A1 | 6/2019 | Guthrie et al. | |
| 2020/0045011 A1 | 2/2020 | Nayak et al. | |

(Continued)

FOREIGN PATENT DOCUMENTS

| | | |
|---|---|---|
| CN | 101163051 A | 4/2008 |
| CN | 106843749 A | 6/2017 |
| CN | 109634974 A | 4/2019 |

(Continued)

*Primary Examiner* — Kevin Verbrugge
(74) *Attorney, Agent, or Firm* — Conley Rose, P.C.

(57) ABSTRACT

A data processing method implemented by a network interface card device, wherein the method comprises receiving, from a first client, a first access request carrying an access address, detecting whether the first access request has a conflict; and processing the conflict according to a processing policy when the network interface card device detects that the first access request has a conflict.

20 Claims, 3 Drawing Sheets

(56) References Cited

U.S. PATENT DOCUMENTS

2023/0195340 A1\* 6/2023 Sherlock ............... G06F 3/0656
　　　　　　　　　　　　　　　　　　711/114

FOREIGN PATENT DOCUMENTS

| CN | 105849688 B | 10/2019 | |
|---|---|---|---|
| CN | 110784557 A | 2/2020 | |
| EP | 3382998 A1 \* | 10/2018 | ......... H04L 61/5046 |
| EP | 3606014 A1 \* | 2/2020 | ......... G06F 9/45558 |
| EP | 4102349 A1 \* | 12/2022 | ........... G06F 3/0605 |

\* cited by examiner

DATA PROCESSING METHOD AND DEVICE

CROSS-REFERENCE TO RELATED APPLICATIONS

This is a continuation of International Patent Application No. PCT/CN2021/078734 filed on Mar. 2, 2021, which claims priority to Chinese Patent Application No. 202010153571.4 filed on Mar. 6, 2020. The disclosures of the aforementioned applications are hereby incorporated by reference in their entireties.

TECHNICAL FIELD

Embodiments of this application relate to the field of computer technologies, and in particular, to a data processing method and a device thereof.

BACKGROUND

In a computer application field, a shared volume of a storage system may be accessed by a plurality of users, and read and write may be performed on the shared volume by the plurality of users. When a plurality of users accesses a same shared volume, software corresponding to the shared volume may be used for conflict management, to avoid a multi-user access conflict.

When the software corresponding to the shared volume is used for conflict management, a storage node corresponding to the shared volume needs to participate in the conflict management, that is, a processor resource of the storage node needs to be occupied.

SUMMARY

Embodiments of this application provide a data processing method, which is used in data storage. When a write conflict occurs, the conflict is processed by a network interface card device. This avoids participation by a processor of a storage node, and saves a resource of the processor of the storage node.

A first aspect of the embodiments of this application provides a data processing method.

When a first client needs to access a storage node, the first client sends a first access request to a network interface card device corresponding to the storage node. The first access request carries an access address of the storage node that needs to be accessed.

After receiving the first access request, the network interface card device parses the first access request, and detects, based on the access address carried in the first access request, whether the first access request has a conflict.

When detecting that the access address that the first access request requests to access is being accessed, the network interface card device determines that a conflict exists.

After a conflict occurs, the network interface card device processes the conflict according to a processing policy. The processing policy is preset by the network interface card device.

In this embodiment of this application, when a write conflict occurs, conflict management may be performed by using the network interface card device, without participation by a processor of the storage node, thereby saving a resource of the processor of the storage node.

Based on the first aspect of the embodiments of this application, in a first implementation of the first aspect of the embodiments of this application, the first access request sent by the first client is a write request. Before the network interface card device receives the first access request, the network interface card device receives a second write request sent by a second client. If an access address carried in the second write request is the same as that in the first access request, the network interface card device determines, based on the fact that the access address carried in the second write request is the same as that in the first access request, that the first access request conflicts with the second write request.

In this embodiment of this application, the network interface card device determines, based on the fact that the first access request and the second write request have a same access address, that a conflict occurs. This improves implementability of a solution.

Based on the first aspect of the embodiments of this application or the first implementation of the first aspect of the embodiments of this application, in a second implementation of the first aspect of the embodiments of this application, the first access request sent by the first client is a read request. Before the network interface card device receives the first access request, the network interface card device receives a third write request sent by a third client. If an access address carried in the third write request is the same as that carried in the first access request, the network interface card device determines, based on the third write request and the first access request, that the first access request conflicts with the third write request.

In this embodiment of this application, the network interface card device determines, based on the fact that the first access request and the second write request have a same access address, that a conflict occurs. This improves implementability of a solution.

Based on the first aspect, the first implementation of the first aspect, or the second implementation of the first aspect of the embodiments of this application, in a third implementation of the first aspect of the embodiments of this application, the first access request is used to write second data to the access address corresponding to the storage node. The network interface card device determines, based on the access address in the first access request and a status attribute of metadata corresponding to the access address, that a conflict exists. The network interface card device processes the second data according to the processing policy. The processing policy is generated by the network interface card device.

In this embodiment of this application, the network interface card device determines, based on the status attribute of the metadata, that a conflict exists. This improves implementability of a solution.

Based on the first aspect, the first implementation of the first aspect, or the third implementation of the first aspect of the embodiments of this application, in a fourth implementation of the first aspect of the embodiments of this application, when updating, based on the second write request, the status attribute of the metadata corresponding to the access address, the network interface card device updates the status attribute of the metadata corresponding to the access address to writing by the second client.

In this embodiment of this application, the network interface card device updates the status attribute to writing by the second client, to clarify information about a client that is currently performing writing. When the client has a write request subsequently, writing can continue. This improves data writing efficiency.

Based on the first aspect, the first implementation of the first aspect, or the third implementation of the first aspect of the embodiments of this application, in a fifth implementation of the first aspect of the embodiments of this application, when updating, based on the second write request, the status attribute of the metadata corresponding to the access address, the network interface card device updates the status attribute of the metadata corresponding to the access address to a writing state.

In this embodiment of this application, the network interface card device updates the status attribute to the writing state. This improves implementability of a solution.

Based on the first aspect, the first implementation of the first aspect, or the fifth implementation of the first aspect of the embodiments of this application, in a sixth implementation of the first aspect of the embodiments of this application, when processing the second data according to the processing policy, the network interface card device may send a first conflict notification to a processor corresponding to the access address. The first conflict notification indicates that an access address to which the second write request of the second client requests to write data is the same as the access address to which the first access request of the first client requests to write data.

In this embodiment of this application, the network interface card device sends the first conflict notification to the processor such that the processor performs subsequent processing. This improves implementability of a solution.

Based on the first aspect, the first implementation of the first aspect, or the fifth implementation of the first aspect of the embodiments of this application, in a seventh implementation of the first aspect of the embodiments of this application, when processing the second data according to the processing policy, the network interface card device may directly discard the second data, that is, may not obtain the second data. After discarding the second data, the network interface card device sends a second conflict notification to the first client. The second conflict notification indicates that the access address to which the first access request of the first client requests to write data is the same as an access address to which the second write request of the second client requests to write data.

In this embodiment of this application, the network interface card device directly discards the second data, and sends the second conflict notification to the first client, without processing the second data by using a central processing unit (CPU). This saves a CPU resource.

Based on the first aspect, the first implementation of the first aspect, or the seventh implementation of the first aspect of the embodiments of this application, in an eighth implementation of the first aspect of the embodiments of this application, after the network interface card device writes the data corresponding to the second client to a data block, the network interface card device receives a feedback result sent by the processor. The feedback result indicates that writing of the data corresponding to the second client is completed. The network interface card device invokes, based on the feedback result, a conflict clearing interface integrated in the network interface card device to clear the status attribute of the metadata corresponding to the access address.

In this embodiment of this application, after the writing of the data corresponding to the second client is completed, the network interface card device invokes the conflict clearing interface to clear the status attribute of the metadata such that the access address can be accessed by a new client. This improves implementability of a solution.

Based on the first aspect, the first implementation of the first aspect, or the eighth implementation of the first aspect of the embodiments of this application, in a ninth implementation of the first aspect of the embodiments of this application, the metadata corresponding to the data block may include a version number of the data block, a current conflict status of the data block, and/or a number of a client currently accessing the data block, and a corresponding quantity of data blocks.

In this embodiment of this application, a specific composition form of the metadata is illustrated as an example. This improves implementability of a solution.

A second aspect of the embodiments of this application provides a network interface card device.

The network interface card device includes an interface and a processor. The interface communicates with the processor. The interface is configured to receive a first access request of a first client. The first access request carries an access address.

The processor is configured to detect whether the first access request has a conflict, and when detecting that the first access request has a conflict, process the conflict according to a processing policy.

Based on the implementation of the second aspect of the embodiments of this application, in a first implementation of the second aspect of the embodiments of this application, the first access request is a write request. The interface is further configured to: before receiving the first access request of the first client, receive a second write request of a second client. The second write request includes the access address.

The processor is further configured to detect that the first access request conflicts with the second write request.

Based on the second aspect of the embodiments of this application or the first implementation of the second aspect of the embodiments of this application, in a second implementation of the second aspect of the embodiments of this application, the first access request is a read request. The interface is further configured to: before receiving the first access request of the first client, receive a third write request of a third client. The third write request includes the access address.

The processor is further configured to detect that the first access request conflicts with the third write request.

Based on the second aspect, the first implementation of the second aspect, or the second implementation of the second aspect of the embodiments of this application, in a third implementation of the second aspect of the embodiments of this application, the first access request is used to write second data to the access address.

The processor is further configured to determine, based on the first access request and metadata, that a conflict exists. The metadata represents a status attribute of the access address.

The processor is further configured to process the second data according to the processing policy. The processing policy is generated by the processor.

Based on the second aspect, the first implementation of the second aspect, or the third implementation of the second aspect of the embodiments of this application, in a fourth implementation of the second aspect of the embodiments of this application, the processor is further configured to update, based on the second write request, the status attribute of the metadata to writing by the second client.

Based on the second aspect, the first implementation of the second aspect, or the third implementation of the second aspect of the embodiments of this application, in a fifth implementation of the second aspect of the embodiments of this application, the processor is further configured to update the status attribute of the metadata to a writing state based on the second write request.

Based on the second aspect, the first implementation of the second aspect, or the fifth implementation of the second aspect of the embodiments of this application, in a sixth implementation of the second aspect of the embodiments of this application, the processor of the network interface card device is configured to send a first conflict notification to a processor corresponding to the access address. The first conflict notification is used to indicate that the first access request conflicts with the second write request.

Based on the second aspect, the first implementation of the second aspect, or the fifth implementation of the second aspect of the embodiments of this application, in a seventh implementation of the second aspect of the embodiments of this application, the processor is configured to discard the second data.

The interface is further configured to send a second conflict notification to the first client. The second conflict notification is used to indicate that the first access request conflicts with the second write request.

Based on the second aspect, the first implementation of the second aspect, or the seventh implementation of the second aspect of the embodiments of this application, in an eighth implementation of the second aspect of the embodiments of this application, the interface is further configured to receive a feedback result sent by the processor corresponding to the access address. The feedback result indicates that writing of data of the second write request is completed.

The processor is further configured to clear the status attribute of the metadata based on the feedback result.

Based on the second aspect, the first implementation of the second aspect, or the eighth implementation of the second aspect of the embodiments of this application, in a ninth implementation of the second aspect of the embodiments of this application, the status attribute of the metadata includes at least one of the following: a version number, a conflict status, or a number of a client currently performing access.

A third aspect of the embodiments of this application provides a network interface card device, including a receiving unit configured to receive a first access request of a first client, where the first access request carries an access address, a processing unit configured to detect whether the first access request has a conflict, where when detecting that the first access request has a conflict, the processing unit processes the conflict according to a processing policy.

Based on the implementation of the third aspect of the embodiments of this application, in a first implementation of the third aspect of the embodiments of this application, the first access request is a write request. The receiving unit is further configured to: before receiving the first access request of the first client, receive a second write request of a second client. The second write request includes the access address.

The processing unit is further configured to detect that the first access request conflicts with the second write request.

Based on the third aspect of the embodiments of this application or the first implementation of the third aspect of the embodiments of this application, in a second implementation of the third aspect of the embodiments of this application, the first access request is a read request. Before receiving the first access request of the first client, the receiving unit receives a third write request of a third client. The third write request includes the access address.

The processing unit is further configured to detect that the first access request conflicts with the third write request.

Based on the third aspect, the first implementation of the third aspect, or the second implementation of the third aspect of the embodiments of this application, in a third implementation of the third aspect of the embodiments of this application, the first access request is used to write second data to the access address.

The processing unit is further configured to determine, based on the first access request and metadata, that a conflict exists. The metadata represents a status attribute of the access address.

The processing unit is further configured to process the second data according to the processing policy. The processing policy is generated by the processing unit.

Based on the third aspect, the first implementation of the third aspect, or the third implementation of the third aspect of the embodiments of this application, in a fourth implementation of the third aspect of the embodiments of this application, the processing unit is further configured to update, based on the second write request, the status attribute of the metadata to writing by the second client.

Based on the third aspect, the first implementation of the third aspect, or the third implementation of the third aspect of the embodiments of this application, in a fifth implementation of the third aspect of the embodiments of this application, the processing unit is further configured to update the status attribute of the metadata to a writing state based on the second write request.

Based on the third aspect, the first implementation of the third aspect, or the fifth implementation of the third aspect of the embodiments of this application, in a sixth implementation of the third aspect of the embodiments of this application, the network interface card device further includes a sending unit configured to send a first conflict notification to a processor corresponding to the access address. The first conflict notification is used to indicate that the first access request conflicts with the second write request.

Based on the third aspect, the first implementation of the third aspect, or the fifth implementation of the third aspect of the embodiments of this application, in a seventh implementation of the third aspect of the embodiments of this application, the processing unit is configured to discard the second data.

The network interface card device further includes a sending unit configured to send a second conflict notification to the first client. The second conflict notification is used to indicate that the first access request conflicts with the second write request.

Based on the third aspect, the first implementation of the third aspect, or the seventh implementation of the third aspect of the embodiments of this application, in an eighth implementation of the third aspect of the embodiments of this application, the receiving unit is further configured to receive a feedback result sent by the processor. The feedback result indicates that writing of data of the second write request is completed.

The processing unit is further configured to clear the status attribute of the metadata based on the feedback result.

Based on the third aspect, the first implementation of the third aspect, or the eighth implementation of the third aspect of the embodiments of this application, in a ninth implementation of the third aspect of the embodiments of this application, the status attribute of the metadata includes at least one of the following: a version number, a conflict status, or a number of a client currently performing access.

A fourth aspect of the embodiments of this application provides a computer storage medium. The computer storage medium stores instructions. When the instructions are executed on a computer, the computer is enabled to perform the method according to any one of the implementations of the first aspect of this application.

A fifth aspect of the embodiments of this application provides a computer program product. When the computer program product is executed on a computer, the computer is enabled to perform the method according to the implementation of the first aspect of this application.

It can be learned from the foregoing technical solutions that embodiments of this application have the following advantages.

In the embodiments of this application, when a write conflict occurs, first data to be written to a same data block is processed according to the processing policy generated by the network interface card device. This avoids participation by the processor of the storage node, and saves a resource of the processor of the storage node.

DESCRIPTION OF EMBODIMENTS

Embodiments of this application provide a data processing method, which is used in data storage. When an access conflict occurs, the conflict is processed according to a processing policy generated by a network interface card device. This avoids participation by a processor of a storage node, and saves a resource of the processor of the storage node.

Figure 1:
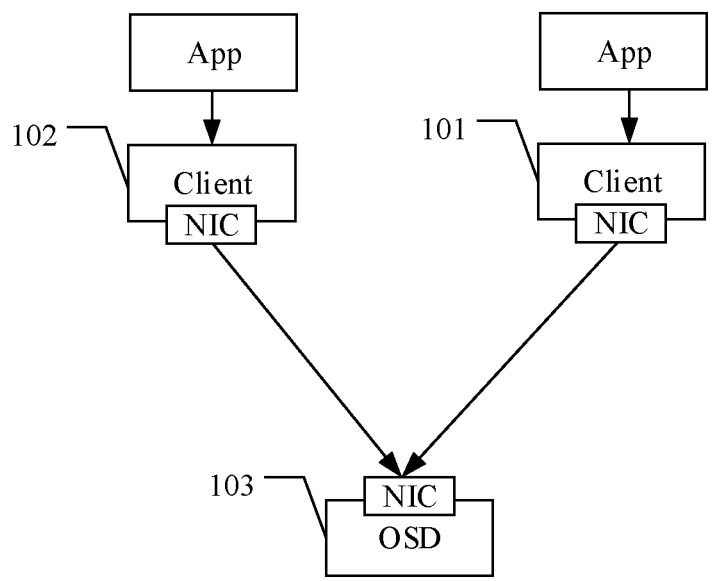
FIG. 1 is a schematic diagram of a storage system framework according to an embodiment of this application.

FIG. 1 is a schematic diagram of a storage system framework according to this application.

An embodiment of this application provides a storage system framework. The storage system framework includes at least two clients: a first client 101 and a second client 102, and at least one storage node 103.

The first client 101 and the second client 102 each include a network interface card (NIC) device, and the storage node 103 includes a NIC device. The storage node 103 further includes a processor, such as a CPU.

The first client is configured to store data onto the storage node 103.

Figure 2:
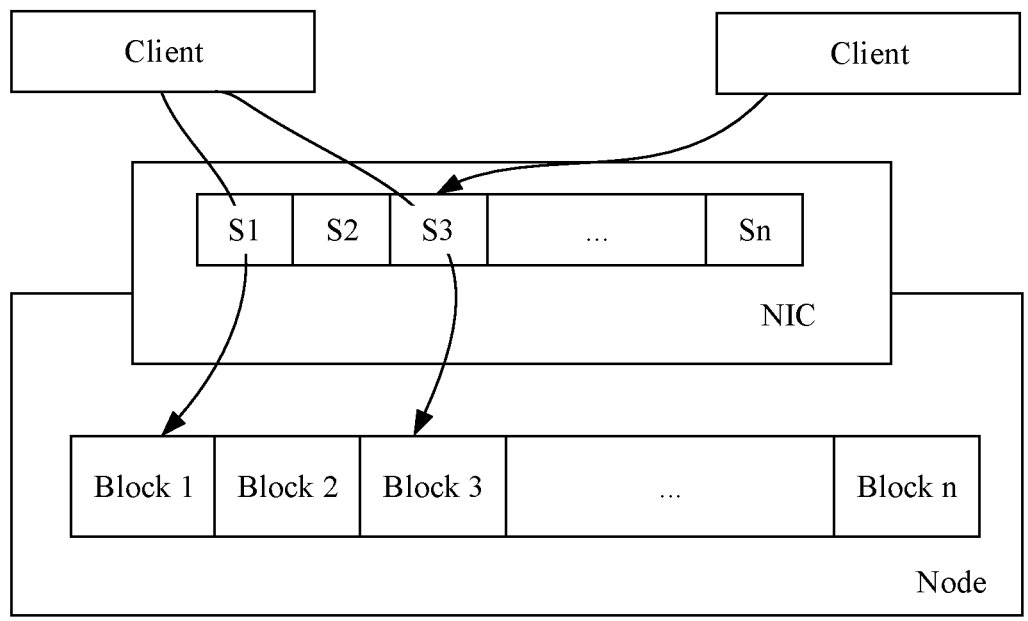
FIG. 2 is another schematic diagram of a storage system framework according to an embodiment of this application.

Referring to FIG. 2, the network interface card device of the storage node in this embodiment of this application includes a conflict detector. Metadata is preset in the conflict detector. Different metadata Sn corresponds to a different data block n in the storage node. It should be noted that, one piece of metadata may correspond to one data block. Alternatively, one piece of metadata may correspond to a plurality of data blocks. This is not limited herein. The data block is an address at which a client accesses data, that is, an access address.

It should be noted that, a size of one data block may be configured to be 4K or 64K. It can be understood that, another size may be configured, for example, 128K. This is not limited herein.

When the first client needs to write data to a corresponding data block 1, metadata S1 corresponding to the conflict detector of the network interface card device is used for determining. When no other client is writing data to the data block, the first client can write the data to the data block.

In an actual application process, the data storage node may be simultaneously accessed by a plurality of clients. When a plurality of clients simultaneously requests to write data to a same data block, the network interface card device performs corresponding processing.

The following describes the data processing method in this embodiment of this application with reference to the storage system frameworks in FIG. 1 and FIG. 2.

Figure 3:
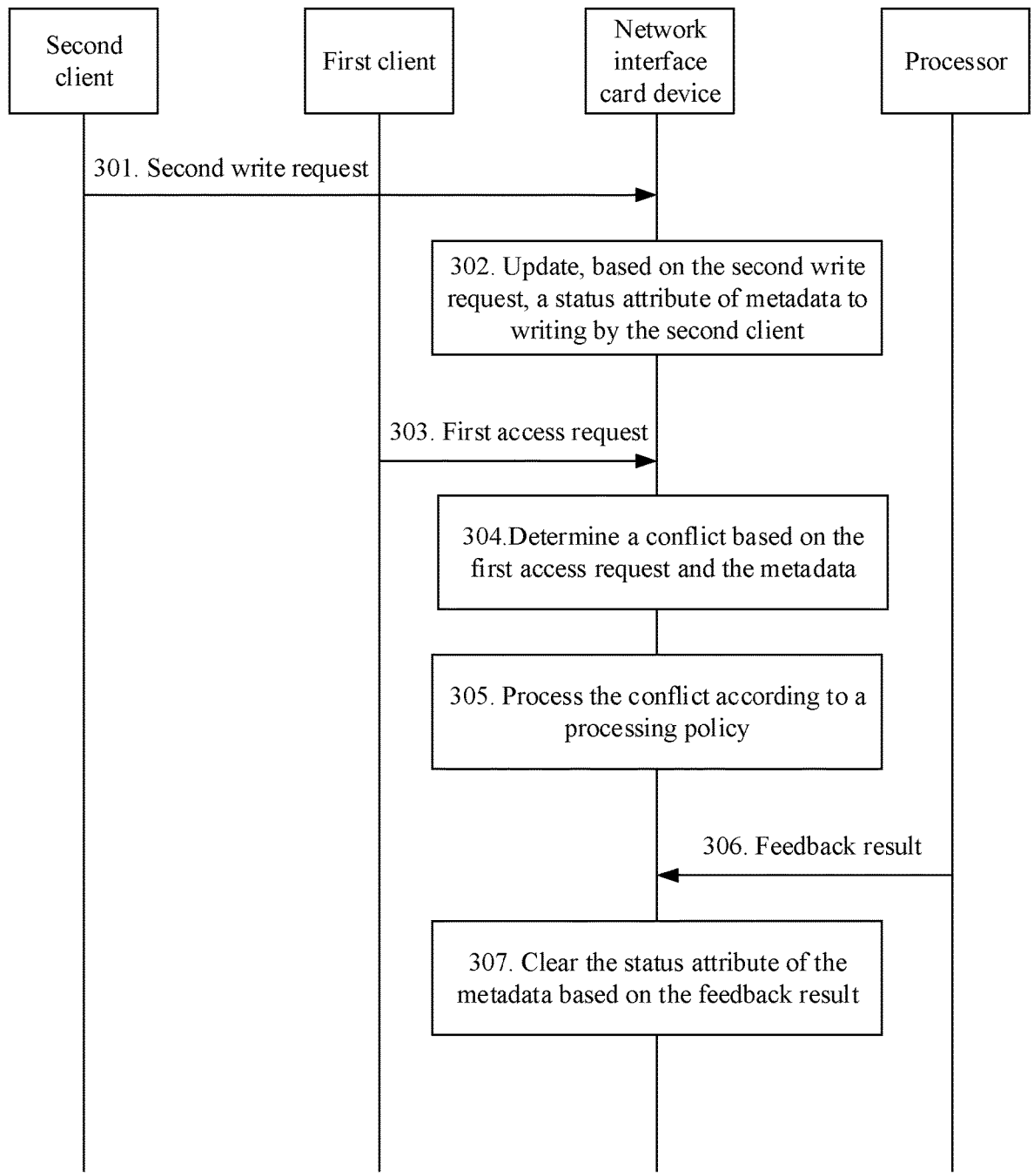
FIG. 3 is a schematic flowchart of a data processing method according to an embodiment of this application.

FIG. 3 is a schematic flowchart of an embodiment of a data processing method according to this application.

In step 301, a second client sends a second write request to a network interface card device.

When the second client needs to write data to a storage node, the second client sends the second write request to the network interface card device corresponding to the storage node. The second write request is used to write the data of the second client to a data block in the storage node, that is, to an access address carried in the second write request.

It can be understood that, in an actual application process, based on a size of the data that the second client requests to write, the second write request of the second client may be sent to a network interface card device of a buffer memory corresponding to the storage node, or may be directly sent to a network interface card device of the storage node. This is not limited herein.

Before the second client sends the second write request to the network interface card device, at an initialization stage of a storage system, service software corresponding to the storage node registers information about a shared resource of the storage node with the network interface card device. The information about the shared resource includes but is not limited to a start address of a data block of the storage node, a size of a data block of the shared resource, and a quantity of data blocks of the shared resource. That is, the quantity of corresponding data blocks, the size of the data block, and the start address of the data block are recorded by using metadata in the storage node.

At the initialization stage of the storage system, the storage node further sets a corresponding processing policy, and initializes the conflict detector on the network interface card device. The processing policy is used to process a read/write conflict when the read/write conflict occurs.

In step 302, the network interface card device updates, based on the second write request, a status attribute of the metadata to writing by the second client.

After the network interface card device receives the second write request sent by the second client, the network interface card device parses the data in the second write request, that is, parses an input/output (I/O) data packet corresponding to the data in the second write request, to obtain an access type and a data block (an access address) to which the I/O data packet corresponding to the data of the second write request is to be written. The access type includes a write request or a read request. The network interface card device determines the status attribute of the metadata corresponding to the data block to which the data is to be written. When the status attribute of the metadata corresponding to the data block is empty, the network interface card device writes the data of the second write request to the corresponding data block, and updates the status attribute of the metadata to writing by the second client. Writing by the second client indicates that the second client is writing the data to the corresponding data block. In another implementation, the status attribute indicates that no access conflict exists. The network interface card device writes the data of the second write request to the corresponding data block, and updates the status attribute of the metadata to writing by the second client. Writing by the second client indicates that the second client is writing the data to the corresponding data block.

It can be understood that, in an actual application process, when the data of the second write request is being written to the corresponding data block, the status attribute of the metadata may alternatively be another status attribute, for example, may be updated to a writing state. The writing state indicates that data is being written to the data block. It can be understood that, there may be a status attribute in another form, provided that the status attribute can indicate that data is being input to a corresponding data block. This is not limited in this embodiment of this application.

In an actual application process, the metadata may include but is not limited to one or more of a version number of the data block, a conflict status of the data block, and an identifier (ID) of a client recently accessing the data block.

For example, version 1.0 is used to represent the version number of the data block. It can be understood that, the version number of the data block may alternatively be represented in another form, for example, V1.1. This is not limited herein.

For example, the status attribute of the data block is identified by using a bitmap. It can be understood that, the status attribute of the data block may alternatively be represented in another form. This is not limited herein.

For example, an owner ID, that is, a client ID, may be used to represent a last client accessing a data block. It can be understood that, the last client accessing a data block may alternatively be represented in another form. This is not limited herein.

In step 303, a first client sends a first access request to the network interface card device.

After the network interface card device updates the status attribute of the metadata, if the first client needs to access the storage node, for example, needs to write data to the storage node, the first client sends the first access request to the network interface card device corresponding to the storage node. The first access request is used to write second data of the first client to the data block in the storage node.

It can be understood that, the first access request may be alternatively used to read data in the storage node. This is not limited herein.

In step 304, the network interface card device determines a conflict exist based on the first access request and the metadata.

When the network interface card device receives the first access request sent by the first client, and when the first access request is a write request, the network interface card device parses the second data in the first access request, that is, parses an I/O data packet corresponding to the second data, to obtain an access type and a data block (an access address) that the I/O data packet corresponding to the second data is to be written. The access type includes a write request or a read request. The network interface card device searches for the corresponding metadata based on the access address corresponding to the second data, and checks the status attribute of the metadata. When the access address to which the I/O data packet corresponding to the second data needs to be written is the same as the access address to which the I/O data packet corresponding to the data of the second write request needs to be written, that is, when the status attribute of the metadata is writing by the second client, the network interface card device determines that a conflict occurs.

It can be understood that, when the first access request is a read request, based on the fact that the address from which data needs to be read is the same as the address to which the data of the second write request is to be written, the network interface card device determines that a conflict occurs. When the first access request is a write request, the network interface card device also determines that a conflict occurs.

In step 305, the network interface card device processes the conflict according to the processing policy.

When the network interface card device determines that a conflict occurs, the network interface card device invokes a different preset processing policy, and processes the conflict according to the different processing policy, so as to process the second data in a different way.

For example, when the first access request is a write request, the processing policy may be sending the I/O data packet corresponding to the second data to the service software of the storage node, that is, sending the I/O data packet corresponding to the second data to the processor of the storage node, and sending a first conflict notification to the processor. The first conflict notification indicates that the second write request sent by the second client conflicts with the first access request sent by the first client, that is, the data block to which the data of the second write request needs to be written is the same as the data block to which the data of the first access request is being written.

After obtaining the first conflict notification and the second data, the processor performs further processing on the second data.

For example, after obtaining the second data, the processor writes the second data to a corresponding log area according to a time sequence of obtaining the second data, and after the writing of the data of the second write request is completed, writes the second data to the corresponding data block.

In an actual application process, a plurality of clients may simultaneously send write requests to the network interface card device for a same data block. When the network interface card device sends, to the processor, data that needs to be written by the plurality of clients, after a current client completes writing to the data block, the processor may further write, to the data block according to a sequence of writing to the log area, the data that needs to be written by the plurality of clients to the data block.

It should be noted that, in an actual application process, the second data may alternatively be processed by using another processing policy. For example, the processing policy may be that the network interface card device discards the second data.

When the network interface card device determines that a write conflict occurs, the network interface card device does not process the second data, that is, discards the second data, and sends a second conflict notification to the first client. The second conflict notification is used to indicate that the second write request sent by the second client conflicts with the first access request sent by the first client. To be specific, the data block to which the data of the second write request needs to be written is the same as the data block to which the data of the first access request is being written.

After receiving the second conflict notification sent by the network interface card device, the first client performs further processing.

For example, after receiving the second conflict notification, the first client quits inputting the second data, that is, no longer sends a write request for the second data to the network interface card device.

It can be understood that, after the first client receives the second conflict notification sent by the network interface card device, the first client may further have another processing manner.

For example, after the first client receives the second conflict notification, the first client continues to generate a new write request, where the new write request is used to request to write the second data to a corresponding data block; and the first client continues to send the new write request to the network interface card device.

It can be understood that, the first client may further have another processing manner. For example, after receiving the second conflict notification, the first client waits for specific duration and then sends a new write request to the network interface card device. A processing manner of the first client is not limited in this embodiment of this application.

It can be understood that, the network interface card device may further process the second data by using another processing policy. This is not limited herein.

When the first access request is a read request, the network interface card device may directly discard the read request, and send the second conflict notification to the first client, so that the first client performs subsequent processing.

In step 306, the processor sends a feedback result to the network interface card device.

After the network interface card device writes the data of the second write request, when the status attribute of the metadata is writing by the second client, the second client continues to send a new write request to the network interface card device, to request to write new data to the data block. In this case, the status attribute of the metadata corresponding to the data block is a state of writing by the second client, that is, the network interface card device determines that the new write request has no conflict. In this case, the network interface card device continues to write the new data of the second client to the data block. After the network interface card device writes the data, the processor obtains the corresponding data written to the storage node. When writing of all data is completed, the processor sends a feedback result to the network interface card device. The feedback result is used to indicate that writing of all current data of the second client is completed.

In step 307, the network interface card device clears the status attribute of the metadata based on the feedback result.

When the network interface card device receives the feedback result sent by the processor, the network interface card device invokes a conflict clearing interface of the network interface card device based on the feedback result, to clear the status attribute of the metadata corresponding to the data block, for example, clear an owner ID of the metadata and a status attribute indicated by a corresponding bitmap; and updates a version number corresponding to the data block.

After the status attribute of the metadata corresponding to the data block is cleared, when another client has a write request and needs to write data to the data block, the network interface card device determines, based on a current status attribute of the metadata, that the write request has no conflict, and writes the data of the other client to the data block.

In an actual application process, step 306 and step 307 are optional steps. The network interface card device may alternatively not clear the status attribute of the metadata based on the feedback result of the processor. For example, when the first client performs writing, the network interface card device starts a timer, and when the timer expires, the network interface card device clears the status attribute of the metadata corresponding to the data block. This is not limited herein.

In this embodiment of this application, when a conflict occurs, the network interface card device processes the conflict according to the processing policy. This avoids conflict management performed by using the software, and saves a resource of the processor of the storage node.

Figure 4:
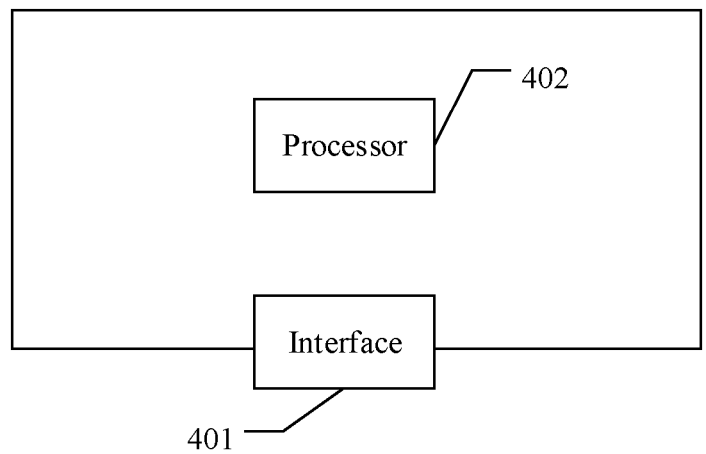
FIG. 4 is a schematic diagram of a structure of a network interface card device according to an embodiment of this application.

The foregoing describes the data processing method in the embodiments of this application. The following describes a network interface card device in the embodiments of this application. FIG. 4 is a schematic diagram of a structure of an embodiment of the network interface card device according to this application.

The network interface card device includes an interface 401 and a processor 402. The interface 401 communicates with the processor 402. The interface 401 is configured to receive a first access request of a first client. The first access request carries an access address.

The processor 402 is configured to detect whether the first access request has a conflict; and when detecting that the first access request has a conflict, process the conflict according to a processing policy.

In this embodiment, operations performed by the interface 401 and the processor 402 in the network interface card device are similar to those described in the embodiment shown in FIG. 3, and details are not described herein again.

Optionally, the first access request is a write request. The interface 401 is further configured to: before receiving the first access request of the first client, receive a second write request of a second client. The second write request includes the access address.

The processor 402 is further configured to detect that the first access request conflicts with the second write request.

Optionally, the first access request is a read request. The interface 401 is further configured to: before receiving the first access request of the first client, receive a third write request of a third client. The third write request includes the access address.

The processor 402 is further configured to detect that the first access request conflicts with the third write request.

Optionally, the first access request is used to write second data to a data block.

The processor 402 is further configured to determine, based on the first access request and metadata, that a conflict exists. The metadata represents a status attribute of the data block.

The processor 402 is further configured to process the second data according to the processing policy. The processing policy is generated by the processor.

Optionally, the processor 402 is further configured to update, based on the second write request, the status attribute of the metadata to writing by the second client.

Optionally, the processor 402 is further configured to update the status attribute of the metadata to a writing state based on the second write request.

Optionally, the interface 401 is configured to send a first conflict notification to a processor corresponding to the access address. The first conflict notification is used to indicate that the first access request conflicts with the second write request.

Optionally, the processor 402 is configured to discard the second data.

The interface 401 is further configured to send a second conflict notification to the first client. The second conflict notification is used to indicate that the first access request conflicts with the second write request.

Optionally, the interface 401 is further configured to receive a feedback result sent by the processor corresponding to the access address. The feedback result indicates that writing of data of the second write request is completed.

The processor 402 is further configured to clear the status attribute of the metadata based on the feedback result.

Optionally, the status attribute of the metadata includes at least one of the following: a version number, a conflict status, a number of a client currently performing access, or the corresponding data block.

In this embodiment, operations performed by the interface 401 and the processor 402 in the network interface card device are similar to those described in the embodiment shown in FIG. 3, and details are not described herein again.

Figure 5:
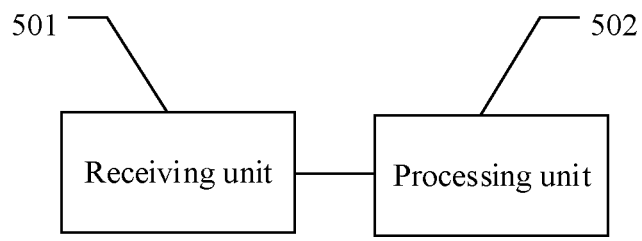
FIG. 5 is a schematic diagram of another structure of a network interface card device according to an embodiment of this application.

FIG. 5 is a schematic diagram of a structure of another embodiment of a network interface card device according to this application.

A receiving unit 501 configured to receive a first access request of a first client, where the first access request carries an access address, and a processing unit 502 configured to detect whether the first access request has a conflict, where when detecting that the first access request has a conflict, the processing unit 502 processes the conflict according to a processing policy.

In this embodiment, operations performed by the units in the network interface card device are similar to those described in the embodiment shown in FIG. 3, and details are not described herein again.

Figure 6:
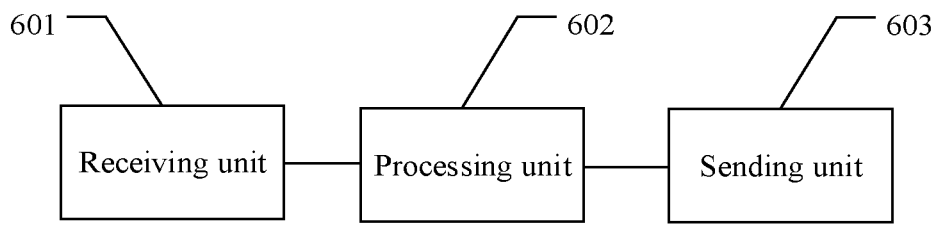
FIG. 6 is a schematic diagram of another structure of a network interface card device according to an embodiment of this application.

FIG. 6 is a schematic diagram of a structure of another embodiment of a network interface card device according to this application.

A receiving unit 601 configured to receive a first access request of a first client, where the first access request carries an access address, and a processing unit 602 configured to detect whether the first access request has a conflict, where when detecting that the first access request has a conflict, the processing unit 602 processes the conflict according to a processing policy.

Optionally, the first access request is a write request. The receiving unit 601 is further configured to: before receiving the first access request of the first client, receive a second write request of a second client. The second write request includes the access address.

The processing unit 602 is further configured to detect that the first access request conflicts with the second write request.

Optionally, the first access request is a read request. Before receiving the first access request of the first client, the receiving unit 601 receives a third write request of a third client. The third write request includes the access address.

The processing unit 602 is further configured to detect that the first access request conflicts with the third write request.

Optionally, the first access request is used to write second data to the access address.

The processing unit 602 is further configured to determine, based on the first access request and metadata, that a conflict exists. The metadata represents a status attribute of the access address.

The processing unit 602 is further configured to process the second data according to the processing policy. The processing policy is generated by the processing unit.

Optionally, the processing unit 602 is further configured to update, based on the second write request, the status attribute of the metadata to writing by the second client.

Optionally, the processing unit 602 is further configured to update the status attribute of the metadata to a writing state based on the second write request.

Optionally, the network interface card device further includes a sending unit 603 configured to send a first conflict notification to a processor corresponding to the access address. The first conflict notification is used to indicate that the first access request conflicts with the second write request.

Optionally, the processing unit 602 is configured to discard the second data.

The sending unit 603 is further configured to send a second conflict notification to the first client. The second conflict notification is used to indicate that the first access request conflicts with the second write request.

Optionally, the receiving unit 601 is further configured to receive a feedback result sent by the processor. The feedback result indicates that writing of data of the second write request is completed.

The processing unit 602 is further configured to clear the status attribute of the metadata based on the feedback result.

Optionally, the status attribute of the metadata includes at least one of the following: a version number, a conflict status, or a number of a client currently performing access.

In this embodiment, operations performed by the units in the network interface card device are similar to those described in the embodiment shown in FIG. 3, and details are not described herein again.

An embodiment of this application further provides a computer-readable storage medium in which a computer program is stored. When the computer program is executed by a computer, a method process related to the network interface card device in any of the foregoing method embodiments is implemented.

A storage node in this embodiment of the present disclosure may be a storage node in a distributed storage system, or may be an array controller in a storage array. This is not limited in the present disclosure.

It should be understood that, the processor mentioned in the foregoing embodiments of this application may be a CPU, or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that, in the foregoing embodiments of this application, there may be one or more processors, and a quantity of processors may be adjusted based on an actual application scenario. This is merely an example for description, and is not limited herein. There may be one or more memories in embodiments of this application. A quantity of memories may be adjusted based on an actual application scenario. This is merely an example for description herein, and is not limited.

It should be further understood that, in the embodiments of this application, the memory, the readable storage medium, or the like described in the foregoing embodiments may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. By way of example and not limitation, RAMs in many forms may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

An embodiment of this application further provides a computer program or a computer program product including the computer program. When the computer program is executed on a computer, the computer is enabled to implement a method procedure related to the network interface card device in any one of the foregoing method embodiments.

All or a part of the embodiment in FIG. 3 may be implemented by using software, hardware, firmware, or any combination thereof. When software is used to implement the embodiment, all or a part of the embodiment may be implemented in a form of a computer program product.

The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the method described in the embodiment in FIG. 3 of this application. The storage medium includes any medium that can store program code, such as a universal serial bus (USB) flash drive, a removable hard disk, a ROM, a RAM, a magnetic disk, or an optical disc.

In the specification, claims, and accompanying drawings of this application, the terms "first", "second", and the like are intended to distinguish similar objects but do not necessarily indicate a specific order or sequence. It should be understood that the terms used in such a way are interchangeable in appropriate circumstances. This is merely a discrimination manner that is used when objects having a same attribute are described in embodiments of this application. In addition, the terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

Names of messages/frames/information, modules, units, or the like provided in embodiments of this application are merely examples, and other names may be used provided that the messages/frames/information, modules, units, or the like have same functions.

The terms used in embodiments of this application are merely for the purpose of illustrating specific embodiments, and are not intended to limit the present disclosure. The terms "a", "the", and "this" of singular forms used in embodiments of this application are also intended to include plural forms, unless otherwise specified in a context clearly. It should be further understood that in the descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural.

Depending on the context, for example, the word "if" used herein may be explained as "while" or "when" or "in response to determining" or "in response to detecting". Similarly, depending on the context, the phrase "if determining" or "if detecting (a stated condition or event)" may be explained as "when determining" or "in response to determining" or "when detecting (the stated condition or event)" or "in response to detecting (the stated condition or event)".

What is claimed is:

1. A method implemented by a network interface card device, wherein the method comprises:
   receiving, from a first client, a first access request carrying an access address;
   detecting whether the first access request has a conflict; and
   processing the conflict according to a processing policy when the first access request has a conflict.

2. The method of claim 1, wherein the first access request is a first write request, wherein before receiving the first access request, the method further comprises receiving, from a second client, a second write request comprising the access address, and wherein detecting whether the first access request has a conflict comprises detecting that the first access request conflicts with the second write request.

3. The method of claim 1, wherein the first access request is a read request, wherein before receiving the first access request, the method further comprises receiving, from a third client, a third write request comprising the access address, and wherein detecting whether the first access request has a conflict comprises detecting that the first access request conflicts with the third write request.

4. The method of claim 2, wherein the first access request writing first data to the access address, wherein detecting whether the first access request has a conflict comprises determining, based on the first access request and metadata, that the conflict exists, wherein the metadata represents a status attribute of the access address, and wherein processing the conflict comprises processing the first data according to the processing policy.

5. The method of claim 4, wherein before detecting whether the first access request has a conflict, the method further comprises updating, based on the second write request, the status attribute of the access address to writing by the second client.

6. The method of claim 4, wherein before detecting whether the first access request has a conflict, the method further comprises updating, based on the second write request, the status attribute of the access address to a writing state.

7. The method of claim 4, wherein processing the conflict comprises:
   sending, to a processor, a first conflict notification indicating that the first access request conflicts with the second write request; and
   processing, by the processor, the access address.

8. The method of claim 4, wherein processing the conflict comprises:
   discarding the second data; and
   sending, to the first client, a second conflict notification indicating that the first access request conflicts with the second write request.

9. The method of claim 4, further comprising:
   receiving, from the processor, a feedback result indicating that writing of data of the second write request is completed; and
   clearing, based on the feedback result, the status attribute of the access address.

10. The method of claim 4, wherein the status attribute of the access address comprises a version number, a conflict status, or a number of clients currently performing access.

11. A network interface card device comprising:
    an interface configured to receive, from a first client, a first access request carrying an access address; and
    a processor communicatively coupled to the interface and configured to:
      detect whether the first access request has a conflict; and
      process the conflict according to a processing policy when the first access request has a conflict.

12. The network interface card device of claim 11, wherein the first access request is a first write request, wherein the interface is further configured receive, from a second client, a second write request comprising the access address and wherein the processor is further configured to detect that the first access request conflicts with the second write request.

13. The network interface card device of claim 11, wherein the first access request is a read request, wherein the interface is further configured to receive, from a third client, a third write request comprising the access address, and wherein the processor is further configured to detect that the first access request conflicts with the third write request.

14. The network interface card device of claim 12, wherein the first access request writing second data to the access address, and wherein the processor is further configured to:
    determine, based on the first access request and metadata, that a conflict exists, wherein the metadata represents a status attribute of the access address; and
    process the second data according to the processing policy.

15. The network interface card device of claim 14, wherein the processor is further configured to update, based on the second write request, the status attribute of the access address to writing by the second client.

16. The network interface card device of claim 14, wherein the processor is further configured to update the status attribute of the access address to a writing state based on the second write request.

17. The network interface card device of claim 14, wherein the interface is configured to send, to the processor, a first conflict notification indicating that the first access request conflicts with the second write request.

18. The network interface card device of claim 14, wherein the processor is further configured to discard the second data, and wherein the interface is further configured to send, to the first client, a second conflict notification indicating that the first access request conflicts with the second write request.

19. The network interface card device of claim 14, wherein the interface is further configured to receive, from the processor, a feedback result corresponding to the access address, wherein the feedback result indicates that writing of data of the second write request is completed, and wherein the processor is further configured to clear the status attribute of the access address based on the feedback result.

20. The network interface card device of claim 14, wherein the status attribute of the access address comprises a version number, a conflict status, or a number of clients currently performing access.

\* \* \* \* \*